DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1367

T889,024

ELIMINATION OF MAGNESIUM GELS IN LIQUID AND SUSPENSION AMMONIATED POLYPHOSPHATE FERTILIZERS DERIVED FROM WET-PROCESS PHOSPHORIC ACID

Thomas M. Jones, 208 Stevenson Court, Sheffield, Ala. 35660, and Alva W. Frazier, Florence, Ala. 35630

Filed Oct. 16, 1970, Ser. No. 81,591

Int. Cl. C05b *7/00*

U.S. Cl. 71—34

No Drawing. 18 Pages Specification

Strong gels form in liquid and suspension fertilizers produced from ammoniated wet-process phosphoric acids high in magnesium and low in aluminum and containing fluorine and polyphosphate. During storage, fluidity decreases and the fertilizers cannot be satisfactorily pumped, poured, or distributed to the soil. The strength of the gel increases with storage time and temperature, the gel is difficult to break, and immediately reforms when broken. Conventional methods of reducing the gel strength were unsatisfactory; for example, dilution with small amounts of water increased the gel strength, and increasing the polyphosphate level up to 50 percent of the $P_2O_5$ did not prevent unsatisfactorily high gel strength.

A method of preventing or destroying the strong gel consists of adding aluminum in an acid-soluble form to the wet-process orthophosphoric acid to increase the $Al_2O_3$:MgO weight ratio to 1.0, 1.5 being preferred; in some phosphates the $Al_2O_3$:MgO weight ratio is 0.5 to 0.8. Some sources of aluminum found to be satisfactory were $AlPO_4$, $Al(NO_3)_3$, $Al_2(SO_4)_3$, spent acid from aluminum processing plants, wet-process phosphoric acid with high $Al_2O_3$, and Florida leached zone ore.